United States Patent [19]

Brendel et al.

[11] Patent Number: 5,024,150
[45] Date of Patent: Jun. 18, 1991

[54] PROCESS FOR REDUCING VIBRATIONS OF SUCCESSIVE SETS OF ROLLS AND A ROLL ARRANGEMENT HAVING REDUCED VIBRATORY TENDENCIES

[75] Inventors: Berhard Brendel, Grefrath; Günter Schrörs, Tönisvorst, both of Fed. Rep. of Germany

[73] Assignee: Edward Küsters Mashinenfabrik GMBH-Co. KG., Krefeld, Fed. Rep. of Germany

[21] Appl. No.: 349,042

[22] Filed: May 8, 1989

[30] Foreign Application Priority Data

May 6, 1988 [DE] Fed. Rep. of Germany ....... 3815445

[51] Int. Cl.⁵ .................... B30B 3/04; B30B 13/00
[52] U.S. Cl. ........................... 100/35; 100/43; 100/155 R; 100/163 R; 100/163 A; 100/168; 100/170; 100/299
[58] Field of Search ................... 100/35, 41, 43, 161, 100/162 R, 162 B, 163 R, 163 A, 168-170, 176, 299

[56] References Cited

U.S. PATENT DOCUMENTS

| 2,567,151 | 9/1951 | Hornbostel | 100/163 A |
| 2,578,594 | 12/1951 | Putnam | 100/162 A |
| 3,111,894 | 11/1963 | Murray | 100/162 R |
| 3,199,442 | 8/1965 | Kuno et al. | 100/169 X |
| 4,128,053 | 12/1978 | Kankaanpaa | 100/162 R |
| 4,375,188 | 3/1983 | Leiviska | 100/162 R |
| 4,464,986 | 8/1984 | Bollani | 100/163 R |
| 4,534,829 | 8/1985 | Ahrweiler et al. | 100/161 X |
| 4,670,102 | 6/1987 | Maurer et al. | 100/161 X |

FOREIGN PATENT DOCUMENTS

| 1561706 | 10/1970 | Fed. Rep. of Germany ... 100/163 R |
| 2420563 | 10/1975 | Fed. Rep. of Germany ... 100/162 R |
| 3119691 | 2/1982 | Fed. Rep. of Germany ... 100/162 R |
| 3639009 | 5/1988 | Fed. Rep. of Germany ... 100/162 B |

Primary Examiner—Philip R. Coe
Assistant Examiner—Stephen F. Gerrity
Attorney, Agent, or Firm—Kenyon & Kenyon

[57] ABSTRACT

To reduce vibrations occurring in sets of rolls that are immediately successive along the direction of travel of a web conducted through the nips formed between the roll sets, a process, especially for use in double calendars used to treat paper webs, is disclosed in which the natural frequency of one set of rolls is altered with respect to the natural frequency of the other set of rolls. In this manner, randomly occurring vibrations in the first set of rolls do not produce a resonance excitation of the second set of rolls. A roll apparatus having reduced vibratory tendencies also is disclosed.

18 Claims, 3 Drawing Sheets

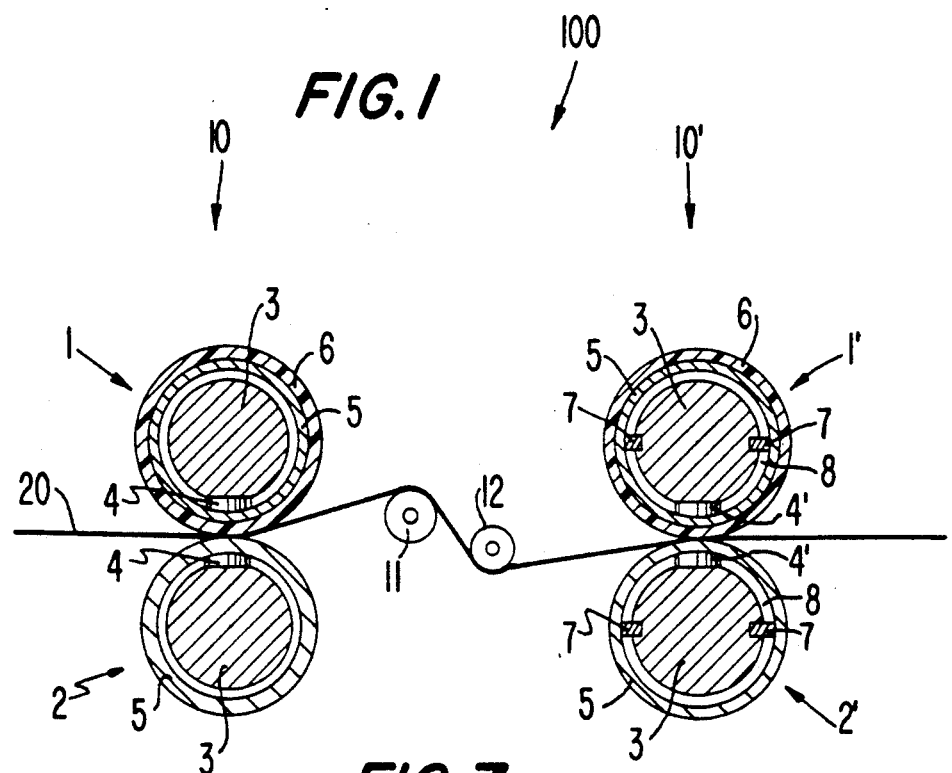
FIG. I
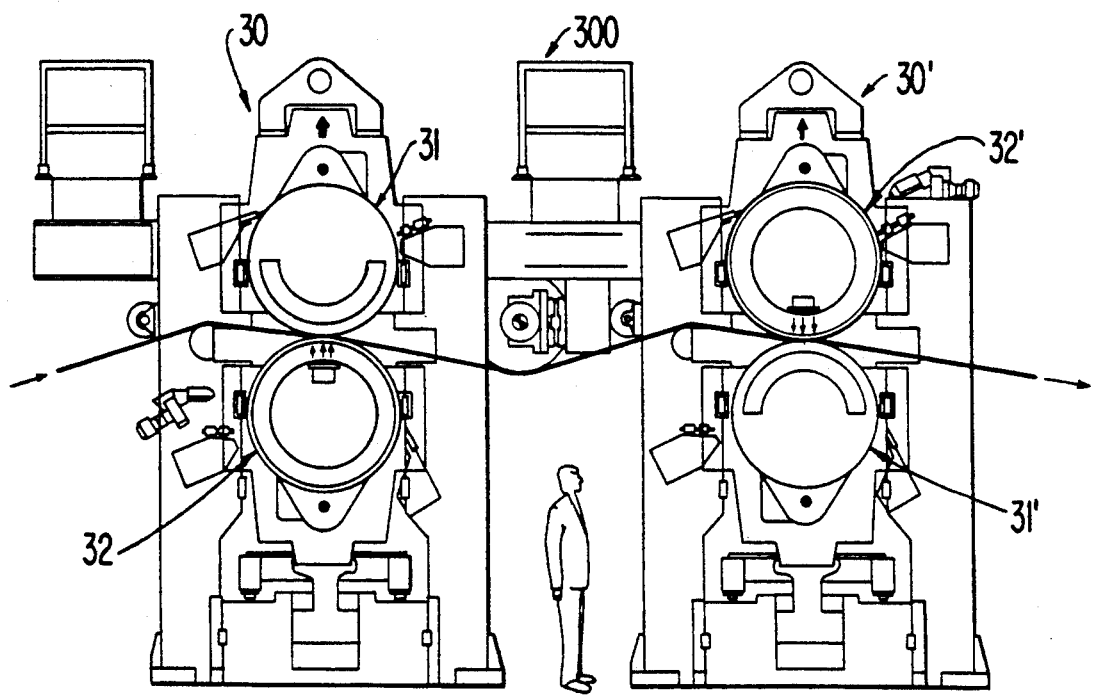
FIG. 7

PROCESS FOR REDUCING VIBRATIONS OF SUCCESSIVE SETS OF ROLLS AND A ROLL ARRANGEMENT HAVING REDUCED VIBRATORY TENDENCIES

BACKGROUND OF THE INVENTION

The invention relates generally to rolls for treatment of webs of material and, more particularly to a process for reducing vibrations in sets of rolls, as well as to a roll arrangement comprising at least two immediately successive sets of rolls having reduced vibratory tendencies.

As used herein the expression "immediately successive" roll sets refers to a roll arrangement in which no additional sets of rolls are provided between two successive sets of rolls. However, guide rollers and the like may be provided between the immediately successive sets of rolls and, thus, this expression does not preclude provision of such additional rollers.

An arrangement of sets of rolls is disclosed in U.S. Pat. No. 4,534,829, which shows a double calendar having two successive sets of rolls. A roll arrangement having more than two successive sets of rolls is depicted in DE-OS 3119691. Such roll arrangements tend to vibrate under certain conditions especially when one or both of the rolls in a set are elastic, i.e., "soft", rolls. These vibrations are manifested not only in undesirable loud noises and vibratory loading of the system's components, but also in vibrations producing undesirable patterns on a web conducted through the nips formed between the roll sets.

Observations have revealed that the second roll set with respect to the direction of web travel generally experiences more vibrations than the first roll set. This phenomenon is attributed to the fact that a random excitation causes the first set of rolls to vibrate according to its natural frequency. While these vibrations may be very weak, they are manifested as successive irregularities in the web, which correspond to the rate of the vibrations. These irregularities constitute a systematic excitation for the second set of rolls when the second set is of a similar construction as the first set of rolls, which usually is the case, and thereby has the same natural frequency as that of the first set.

The vibration problem in calendars having abutting rolls arranged above each other is discussed in DE-AS 2420563. The solution proposed therein is provision of rolls having different diameters, which are selected according to a specific rule. However, in this solution all of the rolls must be situated on top of each other. The invention, on the other hand, is concerned with the vibration problems occurring in successive, separate sets of rolls.

SUMMARY OF THE INVENTION

The invention is directed to the problem of diminishing the rate of occurrence of vibrations in successive sets of rolls of the type discussed above. The invention solves this problem by providing a process for reducing vibrations of at least first and second sets of rolls, immediately successive in the direction of travel of a web conducted through a first nip formed between rolls of the first roll set and a second nip formed between rolls of the second roll set, comprising altering the natural frequency of the first set of rolls such that it differs from the natural frequency of the second set of rolls. When immediately successive sets of rolls are provided with different natural frequencies, any further excitation emanating from possible random vibrations of the first set of rolls, which are manifested in the web, cannot affect the second set of rolls. In addition, the increase in amplitude of actually insignificant vibrations of the first set of rolls, which is normally possible due to the resonance effect upon attaining a natural frequency, does not occur in the second set of rolls.

According to the invention, altering the natural frequency may be accomplished by initially constructing one of the sets of rolls with a different and steadier or more stable natural frequency than the other set of rolls. Thus, the roll sets have natural frequencies that are sufficiently different from each other from the start and, therefore, do not later need to be changed during operation of the rolls to achieve the beneficial effects of the invention. Alternatively, the natural frequency of one of the sets of rolls may be varied during operation when vibrations occur. In this manner, the natural frequency is varied when needed, i.e., when a random excitation produces a roll vibration.

Another aspect of the invention is directed to a roll apparatus having reduced vibratory tendencies for treating a web of material comprising first and second sets of rolls, each roll set including a pair of rolls forming a nip therebetween through which a web of material is conducted. The first and second roll sets are immediately successive in the direction of travel of the web through the nips of the roll sets. The first roll set has a natural frequency that deviates from the natural frequency of the second roll set. The roll apparatus may have means for changing the natural frequency of at least one of the roll sets during operation of the roll apparatus.

At least one of the roll sets may include a flexure-controlled roll having a rotatable hollow cylinder and a stationary crosshead extending through the cylinder to form a clearance space therewith in which the cylinder is supported by at least one supporting plunger abutting the inner circumference of the cylinder. The supporting plunger has a hydrostatic pressure chamber formed with an end open to the inner circumference of the cylinder to form a supporting film of hydraulic fluid between the plunger and inner circumference. Means for conducting hydraulic fluid to the hydrostatic pressure chamber is provided. In this roll, the means for changing the natural frequency may comprise means for varying the amount of hydraulic fluid flowing from the open end of the hydrostatic pressure chamber whereby the thickness of the supporting film is varied.

In this type of flexure-controlled roll, the supporting plungers abut the inner circumference on the cylinder via the liquid film, which supports the cylinder on the crosshead by virtue of the supporting forces transferred through the film. It was discovered that the attenuation of vibrations experienced by this type of roll is dependent upon the thickness of this liquid film and the vibration response may be affected by controlling the quantity of liquid fed to the gap between the inner circumference and the support plunger such that the thickness of the liquid film therebetween may vary over time. The vibration response thereby can be influenced during the operation of the rolls, without the necessity of modifying the construction of the roll. With this type of natural frequency control, care must be taken to ensure that other variables, which may adversely be affected by the varied rate of flow, such as the line pressure and temperature distribution, can be independently adjusted.

The aspects of the invention discussed above solve the problem of reducing vibrations by effecting a variation in the natural frequency of successive sets of rolls. According to a further aspect of the invention, the problem of vibration reduction is solved by interrupting the transmission routes of the vibrations that lie outside of the web through which vibrations are transferred from the first set of rolls to the second set of rolls. This may be accomplished by mounting the first and the second set of rolls in separate frames that do not conduct vibrations therebetween.

This feature cannot prevent the web from transferring excitations from the first set of rolls to the second set of rolls. However, without a construction of this type, vibrations appearing on the first set of rolls not only are transferred through the web, but also through the frame of the machine. By separating the frames, this portion of the transferred vibrations is eliminated.

Further features, advantages and embodiments of the invention are apparent from consideration of the following detailed description, drawings and appended claims.

BRIEF DESCRIPTION OF DRAWINGS

FIG. 1 shows a schematic cross sectional view of a double calendar having two immediately successive sets of rollers, which may employ the principles of the invention.

FIGS. 2-7 illustrate schematic views, partly in section, of various roll arrangements and their supporting structures, which may employ the principles of the invention.

DETAILED DESCRIPTION

Figure 2:
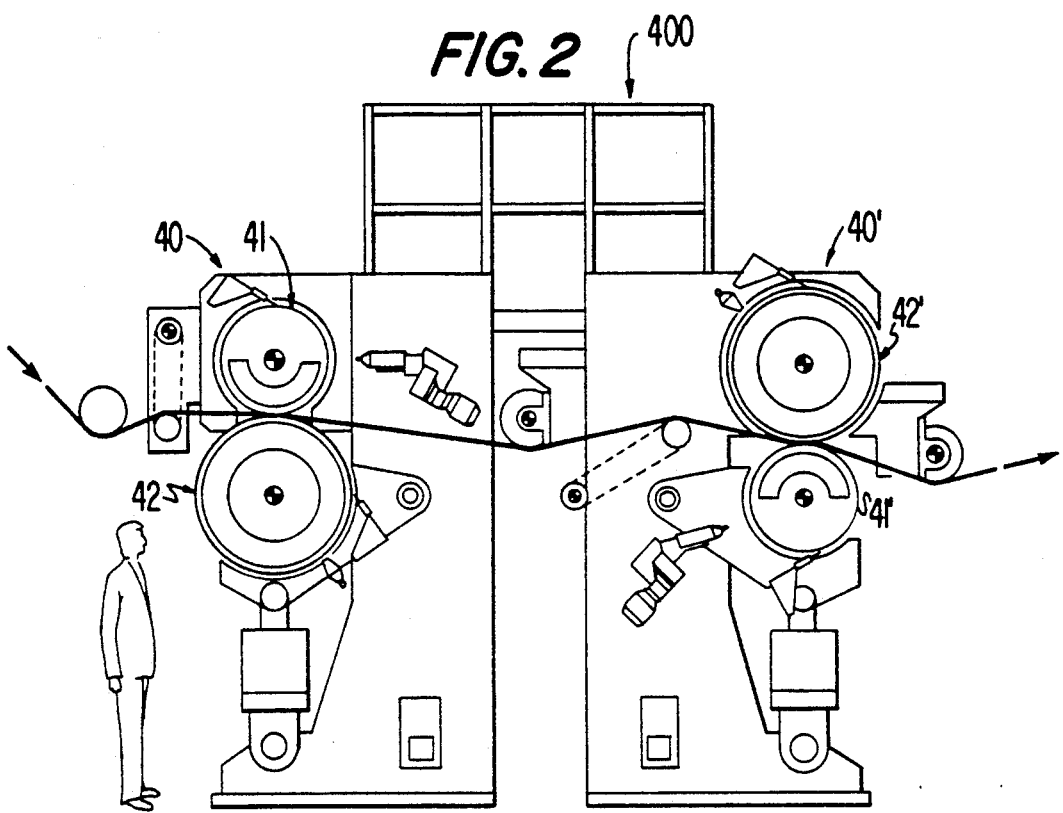

The calendar 100 of FIG. 1 comprises two sets of immediately successive rolls 10 and 10' spaced from one another along a path of travel of a paper web 20. The first set of rolls 10 may comprise rollers 1 and 2 which are zone-wise deflection-controllable.

Each roller 1 and 2 includes a stationary crosshead 3, about which a hollow roll or shell 5 is rotatably mounted and which is itself mounted on a machine stand or framework (not shown) at roller core ends (not shown) which project from shells 5. The upper roller 1 of pair 10 has an elastic covering 6 made of hard rubber having a hardness in the range 85° to 90° Shore D, preferably 88° Shore D, while the hard outer surface of steel shell 5 of the lower roller 2 serves as the working surface thereof. The working pressure is produced along the length of core 3 (in both rollers 1 and 2) by means of hydraulically driven pressure pistons 4, which engage the inner surface of shell 5 and glide therealong. The pressure exerted via each supporting plunger or piston 4 in a roller 1 or 2 is variable independently of the other pistons. Thus, the linear pressure along the length of the roller slot can be varied as desired.

The counter forces to those exerted by the pressure pistons 4 arise through deflection of the stationary core 3. The roller shell or sleeve 5 of each roller 1 and 2 is separated from the core so that the core can bend inside the shell without touching it.

The rollers 1 and 2 may have dimensions of 4 to 5 m in length and 400 to 500 mm in diameter with elastic covering 6 having a thickness of 6 to 20 mm. Preferably, the elastic covering has a thickness of at least 15 mm.

Rollers 1' and 2' of roll set 10' may have the same structural components as rollers 1 and 2, as well as longitudinal seals 7 mounted in core 3 and engaging the inner surface of shell 5. Seals 7, the respective core 3 and shell 5, together with a pair of annular seals (not illustrated) lying in respective planes at the ends of each roller 1' and 2' between the core and the shell, form a longitudinal chamber 8 facing the roller gap or nip. The chambers 8 of rollers 1' and 2' are filled with oil via conduits extending from a pressure source. The oil is pressurized to exert a uniform pressure over the entire length of the roller nip. Pistons 4' of rollers 1' and 2' are operable to decrease the pressure in selected regions of the roller shells 5, whereby the pressure profile along the roller nip is adjustable. Thus, while pressure pistons of rollers 1 and 2 produce or increase pressure at the roller slot, pistons 4' reduce pressure at the nip.

The difference between roll sets 10 and 10' serve only to illustrate the different possibilities. Roll sets 10 and 10' may be identical in the internal structures of their component rollers 1, 2 and 1', 2'. These component rollers may comprise any of the types of rollers known in the art, such as solid rolls, other types of hydrostatically supported rolls, thermally controlled rolls, etc.

The disposition of rollers 1 and 2 relative to the paper web 20 is the same as the disposition of rollers 1' and 2'. That is, in both roller pairs, the roller 1 or 1' with the elastic covering 6 engages the upper side of the paper web 20. This orientation can be changed such that both sides of the web are engaged by one of the elastic coverings. Roller pairs 10 and 10' also can be arranged so that the paper web passes in a vertical direction through the roller nips of successive roller pairs.

Paper web 20 emerges from a paper machine and immediately enters into calendar 100 and is subjected by roller pairs 10 and 10' to a two stage smoothing and glazing treatment.

The natural frequency of a set of rolls, such as roll sets 10, 10', can be influenced in greatly different ways. A set of rolls is a vibratory system having a whole series of parameters and degrees of freedom, which affect the natural frequency of the total system when they are changed. Thus, for instance, the flexural strength of a solid roll is an important consideration. In the case of a flexure-controlled roll, such as a hydrostatically supported roll having a stationary crosshead extending lengthwise through a rotatable hollow cylinder, the flexural strength of these two components is the decisive factor. The inertial mass of the rolls and the elasticity of a roll covering, as well as the elasticity of the web of material also play a part, especially when a paper web and a felt are simultaneously conducted through the nips of the roll sets. All of these components intricately contribute to the vibration response of the total system, i.e., the "set of rolls in operation".

The natural frequency of this system may be changed, for example, by applying one or more separate inertial damping elements to at least one of the rolls of a roll set. The damping effect of these separate elements also may be adjustable. Use of separate inertial damping elements on a single roll is disclosed in DE-OS 3639009, which is the equivalent of copending U.S. application Ser. No. 07/119,586 entitled "Roll For The Pressure Treatment Of Webs Of Material" assigned to the assignee of the invention and now U.S. Pat. No. 4,910,842, the disclosure of which is incorporated by reference herein.

Another way in which the natural frequency may be varied is through use of an attenuation device. One such device for a special bending compensation roll is described in DE-PS 1561706, the disclosure of which is incorporated by reference herein. This document discloses hydraulically supported shoes provided on opposite sides of the crosshead in the active plane. The hydraulic pressure chambers on both sides can be interconnected by way of restrictor ducts. This interconnection produces a damping effect upon flow of hydraulic fluid between the chambers. The number of ducts connected to the chambers and, hence, their damping effectiveness can be varied.

Naturally, the mass of the rolls can be variably selected during construction of the roll sets to vary the natural frequency. In the same way, the flexural strength of the rolls also can vary. For example, the counterrolls of each roll set, which do not immediately rotate, may be constructed differently. In the first set of rolls, the counterroll may be solid, while in the second set, the counterroll may be a cylinder having a crosshead extending therethrough.

Coverings provided on rolls also play an important part in influencing the natural frequency of the system. As discussed above, during paper processing, one roll of each set of rolls may be provided with a plastic covering to form an elastic or "soft" roll, which usually works against a "hard" roll having an outer steel surface. The properties of this covering, its thickness and its hardness, which change with fluctuations in operating temperature, considerably influence the vibration system, as does the diameter of the roll upon which the roll covering is arranged.

Even selection of the material of the cylinder and crosshead, such as chilled (cast) iron, steel, gray (cast) iron, results in different natural frequencies of the total system.

Any type of deliberate alteration of the natural frequencies of successive sets of rolls, such as by influencing one of the above-mentioned parameters, is contemplated under the invention.

FIGS. 2-7 illustrate examples of some of the types of calendar arrangements in which the natural frequencies of the roll sets may be varied according to the principles of the invention discussed above.

The tandem calender arrangement 400 illustrated in FIG. 2 comprises two sets of immediately successive rolls 40, 40' spaced from one another along a path of travel of the web. Each roll set in this embodiment includes a swimming roll 41, 41' and a thermal roll 42, 42'. The orientation of the individual rolls in each set is reversed from that shown in FIG. 1.

Figure 3:
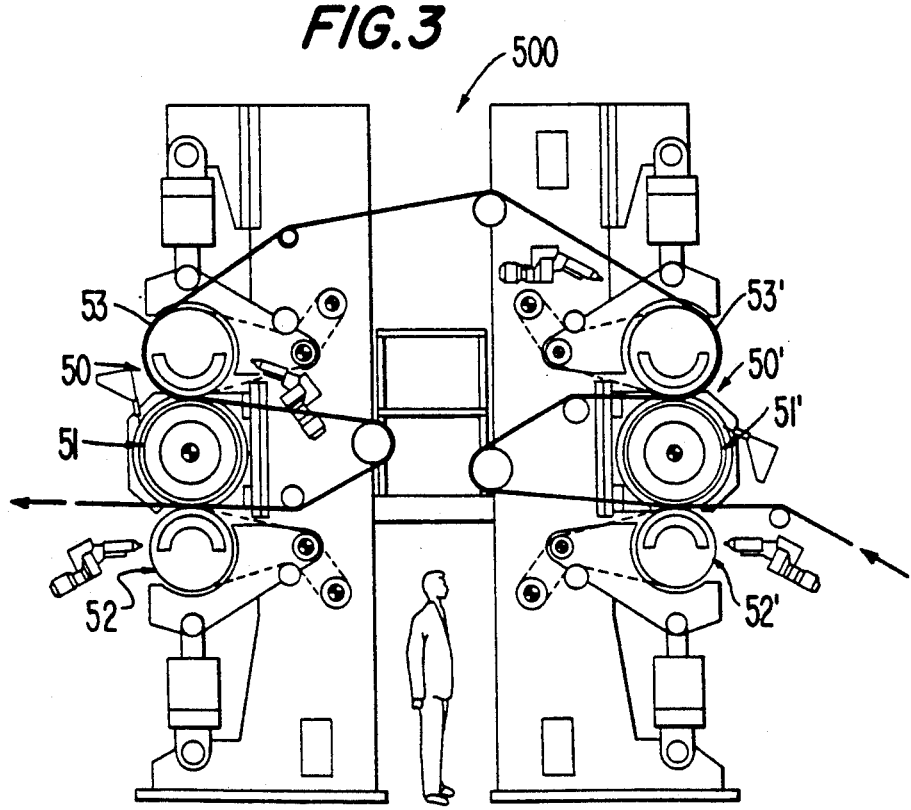

The tandem three roll calender 500 of FIG. 3 comprises two sets of immediately successive rolls 50 and 50' spaced from one another along a path of travel of the web. Each roll set 50, 50' comprises center thermal rolls 51, 51' and swimming rolls 52, 52', and 53, 53'.

Figure 4:
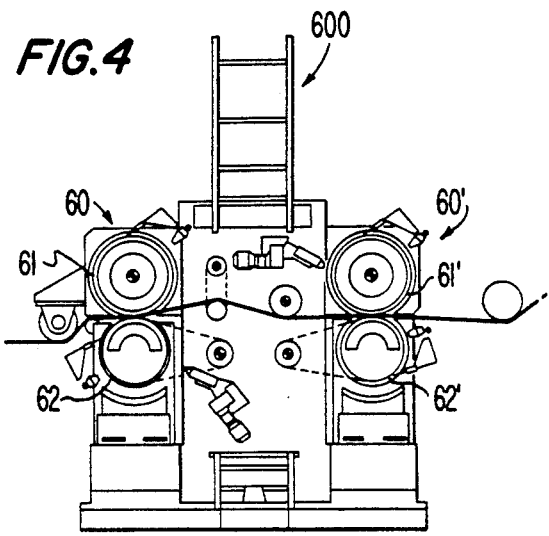

The tandem two roll calender 600 shown in FIG. 4 comprises two sets of immediately successive rolls 60, 60'. Each roll set comprises thermal rolls 61, 61' and swimming rolls 62, 62', which are disposed in the same manner as that illustrated in FIG. 1.

Figure 5:
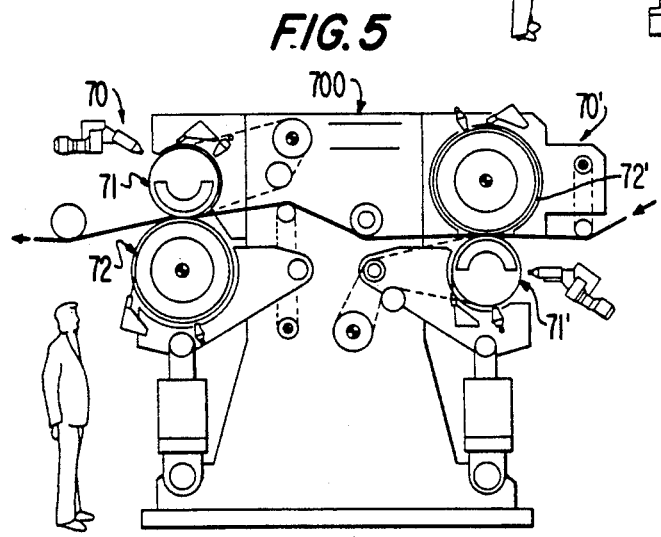

The tandem two roll calender 700 of FIG. 5 is mounted on a single frame and comprises two sets of immediately successive rolls 70, 70'. Each roll set includes swimming rolls 71, 71' and thermal rolls 72, 72', which are disposed in a manner similar to that illustrated in FIG. 2.

Figure 6:
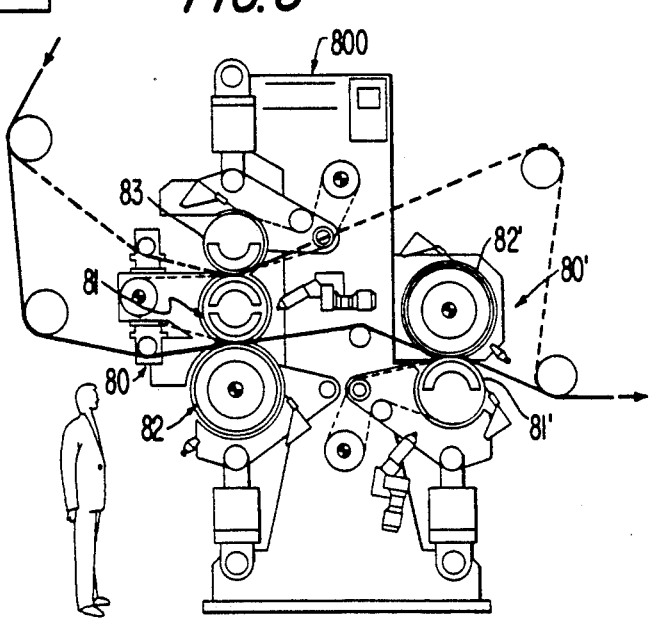

The combination calender 800 illustrated in FIG. 6 comprises two sets of immediately successive rolls 80, 80'. Roll set 80 comprises swimming rolls 81, 83 and thermal roll 82 while roll set 80' comprises swimming roll 81' and thermal roll 82'.

The calender 300 shown in FIG. 7 comprises two sets of immediately successive rolls 30, 30'. Each roll set comprises a swimming roll 31, 31' and a zone controlled, hydraulically supported roll 32, 32'.

What is claimed is:

1. A process for reducing vibrations of at least first and second pairs of rolls, each roll pair being of essentially similar construction and being immediately successive and spaced from each other in the direction of travel of a web, which is conducted through a first nip formed between rolls of the first roll pair and a second nip formed between rolls of the second roll pair, comprising altering the natural frequency of the one of the first and second pairs of rolls such that it differs from the natural frequency of the other roll pair whereby random vibrations of the first roll pair manifested in the web do not form a systematic excitation for the second roll pair.

2. The process of claim 1 wherein the step of altering the natural frequency comprises initially forming the first pair of rolls with a different and steadier natural frequency than the second pair of rolls.

3. The process of claim 2 wherein the step of altering the natural frequency comprises constructing one of the first and second pairs of rolls with a mass that differs from the mass of the other pair of rolls.

4. The process of claim 2 wherein the step of altering the natural frequency comprises forming one of the first and second pairs of rolls from different materials than those used to form the other pair of rolls.

5. The process of claim 4 wherein one of the rolls of the first roll pair is provided with an elastic covering having different properties than an elastic covering provided on one of the rolls of the second roll pair.

6. The process of claim 1 wherein the step of altering the natural frequency comprises varying the natural frequency of one of the first and second pairs of rolls when vibrations occur as the web is conducted through the nips.

7. The process of claim 6 wherein the step of altering the natural frequency comprises providing a separate damping element on an end of one of the rolls of the first and second roll pairs and varying the damping effect of the damping element.

8. The process of claim 6 wherein at least one roll of each roll pair is a flexure-controllable roll having a rotatable hollow cylinder, a stationary crosshead extending through the cylinder to form a surrounding clearance space therewith, shoes provided on opposite sides of the crosshead supporting the cylinder on the crosshead, hydraulic pressure chambers pressing the shoes against the cylinder, restriction ducts connecting the pressure chambers, and a valve member operable to selectively control the number of restrictor ducts communicating with the pressure chambers, and wherein the step of altering the natural frequency comprises changing the number of restrictor ducts connected between the hydraulic pressure chambers of one of the rolls of the first and second roll pairs.

9. The process of claim 1 wherein the first and second roll pairs form at least part of a double calender for treating paper webs.

10. A roll apparatus having reduced vibratory tendencies for treating a web of material comprising first and second pairs of rolls, each roll pair being of essentially similar construction and forming a nip therebetween through which a web of material is conducted, said first and second roll pairs being immediately successive and spaced from each other in the direction of travel of the web through the nips of the roll pairs, said first roll pair having a natural frequency that deviates from the natural frequency of the second roll pair such that random vibrations of the first roll pair manifested in the web do not form a systematic excitation for the second roll pair.

11. The apparatus of claim 10 further comprising means for changing the natural frequency of at least one of the first and second roll pairs during operation of the roll apparatus.

12. The apparatus of claim 11 wherein at least one roll of each of the first and second roll pairs comprises a flexure-controlled roll having a rotatable hollow cylinder and a stationary crosshead extending through the cylinder to form a clearance space therewith, said cylinder being supported by at least one support plunger abutting an inner circumference of the cylinder, said at least one support plunger having a hydrostatic pressure chamber formed with an end open to the inner circumference of the cylinder, means for conducting hydraulic fluid to the hydrostatic pressure chamber to form a supporting film of hydraulic fluid between the support plunger and the inner circumference and wherein said means for changing the natural frequency comprises means for varying the amount of hydraulic fluid flowing from the open end of the hydrostatic pressure chamber whereby the thickness of the supporting film is varied.

13. The apparatus of claim 11 wherein said means for changing the natural frequency comprises provision of a separate damping element on an end of one of the rolls of the first and second roll pairs, said separate damping element including means for varying its damping effect.

14. The apparatus of claim 11 wherein at least one roll of each roll pair is a flexure-controllable roll having a rotatable hollow cylinder, a stationary crosshead extending through the cylinder to form a surrounding clearance space therewith, shoes provided on opposite sides of the crosshead supporting the cylinder on the crosshead, hydraulic pressure chambers pressing the shoes against the cylinder, restrictor ducts connecting the pressure chambers and a valve member operable to selectively control the number of restrictor ducts communicating with the pressure chambers, and wherein said means for changing the natural frequency comprises means for varying the number of restrictor ducts connected between the hydraulic pressure chambers of one of the rolls of the first and second roll sets.

15. The apparatus of claim 10 wherein the mass of the first pair of rolls differs from the mass of the second pair of rolls.

16. The apparatus of claim 10 wherein the first pair of rolls is formed from different materials than those used to form the second pair of rolls.

17. The apparatus of claim 16 wherein one roll of the first roll pair is provided with an elastic covering having different properties than an elastic covering provided on one of the rolls of the second roll pair.

18. The apparatus of claim 10 wherein the first and second roll pairs comprise at least part of a double calender for treating paper webs.

* * * * *